United States Patent [19]

Lombardozzi

[11] Patent Number: 4,636,444
[45] Date of Patent: Jan. 13, 1987

[54] THERMAL PANEL

[76] Inventor: Lucio Lombardozzi, 22-16 35th Street, Astoria, N.Y. 11105

[21] Appl. No.: 810,362

[22] Filed: Dec. 18, 1985

[51] Int. Cl.[4] .......................... B32B 3/12; B32B 3/24
[52] U.S. Cl. .................................. 428/596; 428/600; 428/118; 428/156
[58] Field of Search .............. 428/596, 593, 600, 594, 428/624, 936, 116, 118, 156, 179, 544; 52/145, 404, 309.13, 309.14, 806, 144

[56] References Cited

U.S. PATENT DOCUMENTS

| 2,726,977 | 12/1955 | See et al. | 52/145 |
| 4,203,268 | 5/1980 | Gladden et al. | 52/630 |
| 4,276,873 | 6/1981 | Vroshevich | 52/630 |

FOREIGN PATENT DOCUMENTS

| 751885 | 1/1967 | Canada | 408/116 |
| 79492 | 5/1983 | European Pat. Off. | 52/145 |
| 2272236 | 1/1976 | France | 52/806 |

Primary Examiner—L. Dewayne Rutledge
Assistant Examiner—John J. Zimmerman

[57] ABSTRACT

An improved construction for thermal panels employing a low conductivity core lamina having a plurality of contiguous polygonal recesses on the exposed surface thereof and with each of said polygonal recesses having a concave base surface of thermally radiant reflective character.

12 Claims, 7 Drawing Figures

THERMAL PANEL

This invention relates to thermal insulation and more particularly to an improved construction for thermal insulating panels.

The ever increasing demands for energy and the continually increasing costs of basic fuels have spurred interest not only in energy conservation in general, but, in the increased utilization of thermal insulation in particular. The general efficacy of thermal insulation has been long recognized and expedients ranging from the use of "dead air" space; the use of solid materials of low thermal conductivity; the use of fibrous and cellular materials; the use of coated papers or wallboards of low thermal conductivity; the use of reflective materials, such as aluminum foil, and various combinations and permutations thereof have long been employed for both industrial and residential purposes. In the practical utilization of most of such expedients, the degree of obtainable insulative effect, commonly expressed in terms of an "R" number—which is the ratio of the material thickness divided by its thermal conductivity—is generally proportional to the thickness and/or quantity of insulating material employed.

This invention may be briefly described, in its broader aspect, as an improved construction for a relatively thin and compact thermal panel module of increased insulative character and whose insulative performance is largely dependent upon its geometric character rather than on the inherent properties of its constituent materials. In furtherance of such broad aspect, the subject invention includes the utilization of a core lamina of relatively low thermal conductivity having a multiplicity of contiguous polygonal recesses on at least one of the exposed surfaces thereof and with each of such recesses having a concave base surface of thermally reflective character whose focal point is located outwardly from the exposed defining edges of such recesses. In a narrower aspect, such core lamina is of generally planar configuration presenting a pair of exposed surfaces on either face thereof and with each face having a multiplicity of recesses thereon whose surfaces are of high thermally reflective character. In a still narrower aspect, such recesses may be of varying depth with a consequent location of the focal points thereof at differing levels above the panel surface.

Among the advantages of the subject invention is the provision of a self supporting thermal panel capable of utilization as a structural panel and which, in addition to its marked thermal insulative properties, also may serve as an acoustic barrier. Other advantages include the provision of a compact thermal panel possessed of marked insulative properties and whose radiant heat reflective properties become enhanced at extreme high temperatures. Still further advantages include the provision of a compact, inexpensive and easily fabricated thermal panel that provides enhanced insulative properties for energy efficient and economical industrial and home usage.

The primary object of this invention is the provision of an improved construction for thermal insulative panels.

Another primary object of this invention is the provision of an improved construction for thermal insulative panels whose insulative performance is largely dependent upon its geometric character rather than on its size or the nature of its constituent materials.

Other objects and advantages of the subject invention will become apparent from the following portions of this specification and from the appended drawings which illustrate, in accord with the mandate of the patent statutes, a presently preferred embodiment of a thermal insulative panel construction that incorporates the principles of this invention.

Referring to the drawings.

Figure 1:
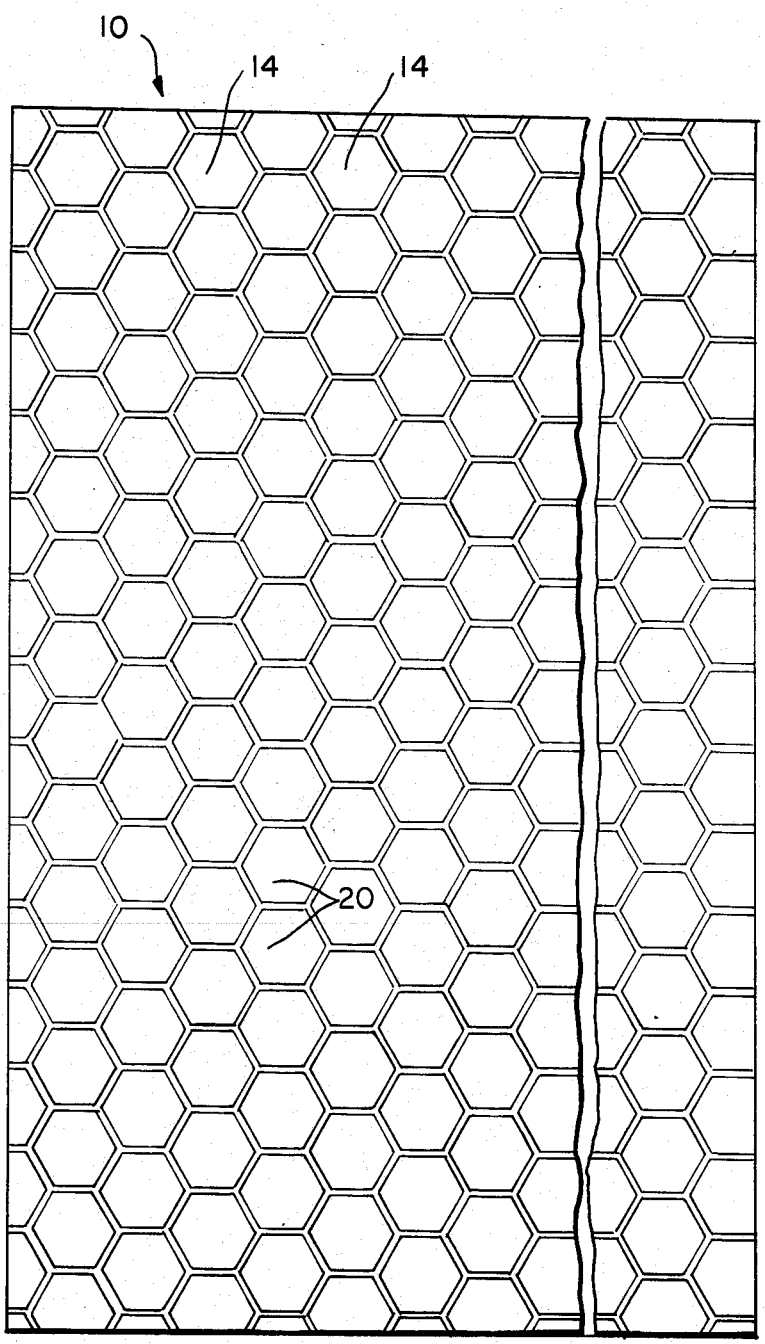
FIG. 1 is a plan view of a thermal panel module embodying the principles of this invention.
Figure 2:
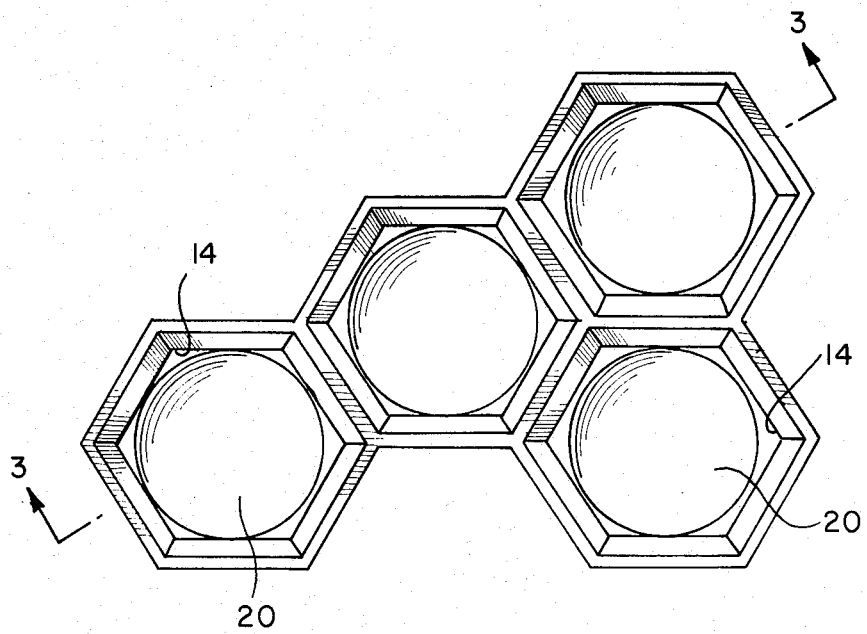
FIG. 2 is an enlarged plan view of a portion of the thermal panel illustrated in FIG. 1.
Figure 3:
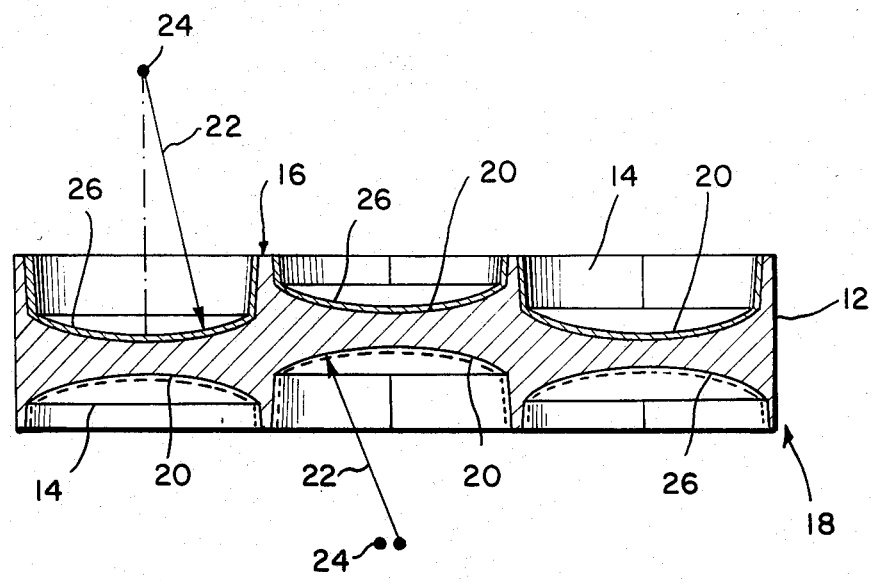
FIG. 3 is a vertical section as taken on line 3—3 of FIG. 2.

Referring to such drawings, the improved thermal panel construction, as depicted by way of example in the form of a thin rectangular module 10 of generally planar character, includes a relatively thin core lamina 12 having a multiplicity of shallow contiguous polygonal recesses 14 on at least one, and preferably on both, of the exposed surfaces 16 and 18 thereof. The core lamina 12 is formed of material of low thermal conductivity and is preferably of rigid character so as to render the module 10 essentially self supporting. The polygonal recesses 14 should be of appropriate character to nest with each other and recesses of hexagonal configuration are highly preferred. As best shown in FIG. 3, the depth of such recesses 14 may vary in a predetermined regular pattern so as to lend the core lamina 12 certain truss characteristics for increased mechanical strength.

Each of the recesses 14 includes a concave base surface 20 of high thermally reflective character. The concave base surfaces 20 are suitably in the form of a segment of the surface of a sphere of a radius 22 that locates the focal point 24 a predetermined distance above the surface of the panel. As will now be apparent, the utilization of hexagonal shaped recesses 14 affords a maximum surface area for such concave base surfaces 20. As also best shown in FIG. 3, the desired high thermally reflective character for each of the concave base surfaces 20 may, for example, be obtained by the disposition of an overlying thin film of reflective metal 26 on the surface of the core lamina 12.

As pointed out earlier, the insulative performance of the above described thermal panel results largely from its geometry rather than from its constituent materials, although certain properties of the latter such as its melting or softening points, will usually be determinative of the ambient condition limits of its use. The utilization of a core lamina 12 of low thermal heat transfer characteristics and the minimization of effective contact area through the contiguous surface recesses cooperatively function to reduce, if not desirably minimize, heat transfer by conduction through the panel. Similarly, the concave base surfaces 20 of high thermally reflective character serve to reflect incident thermal radiation, which normally includes the infra-red spectrum and those portions of the light spectrum having wave lengths of about $10^{-2}$ to $10^{-5}$ centimeters. In such thermal reflection, the focal points of the concave base surfaces 20 will function as localized thermal sources at elevated temperatures in excess of ambient temperature. Such localized elevated temperature thermal sources will permit heat to flow therefrom to encourage radiant heat regeneration and to increase thermal radiation recovery.

As noted above, the constituent materials employed in the fabrication of the described panel, apart from the required low thermal conductivity for the core lamina material and the high thermal reflectivity properties for the concave base surfaces 20, are of concern mainly with respect to the ambient conditions at the locus of intended use thereof. For example, if the core lamina 12 is a moldable resin or polymer, the ambient temperature conditions at the point of usage must be below the softening point of such material. Where high temperature ceramic material is employed for such core lamina 12, the operating range will be permissibly higher. Likewise, in such other instances where a high temperature core material, such as a high temperature ceramic, is employed, the limiting factor may be the melting point of the particular metal utilized to form a more highly efficient thermal radiation reflecting surface 26 on the concave base surface 20.

Figure 4A:
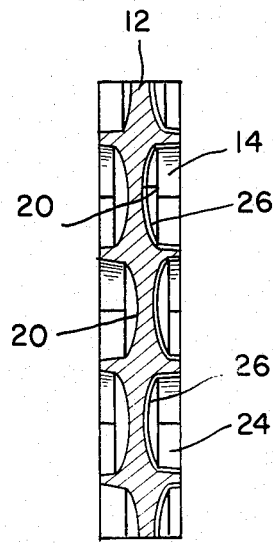
FIGS. 4a through 4d are schematic vertical sections illustrative of possible single and multipanel module combinations of the basic panel construction.
Figure 4B:
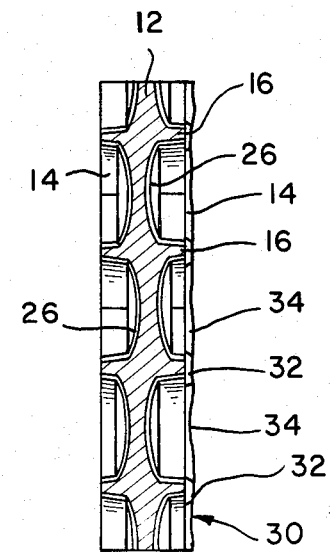
Figure 4C:
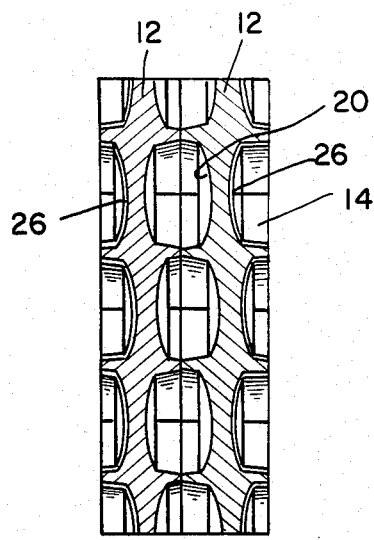
Figure 4D:
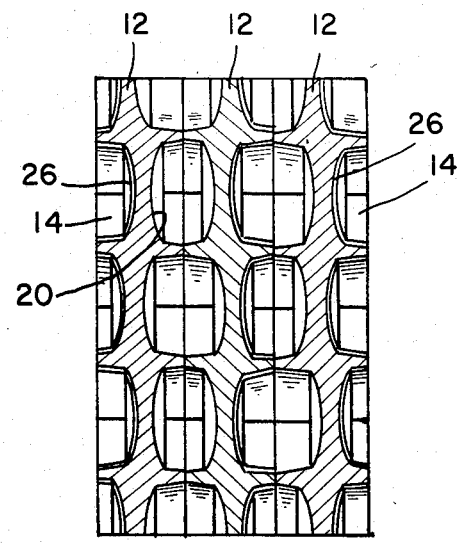

FIGS. 4a through 4d schematically illustrate how varying combinations of the improved thermal panel construction of both the single reflective coated face and double reflective coated face types can be assembled to form operative modules in accord with the exigencies of any particular locus of use thereof. FIG. 4a shows a single core lamina 12 having a reflective coating 26 on one of the exposed recessed surfaces 20 thereof. FIG. 4b shows a further configuration employing the principles of this invention. As there shown, one surface 16 may be surmounted by a perforated plate 20 of highly heat conductive metal sheet. As shown, the solid portions 32 of such sheet overly the solid portions of the lamina and the apertures 34 therein are coaxially disposed with respect to the arcuate reflective surfaces located at the bottom of the recesses in the lamina. FIG. 4b further shows a single core lamina 12 having a reflective coating 26 on both exposed surfaces thereof. FIG. 4c shows a pair of single surface coated core lamina 12 that compositely present a double thickness core having both outwardly exposed surfaces bearing a thermally reflective coating 26. FIG. 4d shows three single surface coated cores in interfaced engagement with each other. As will now be apparent to those skilled in this art, many other combinative permutations are possible.

By way of further example, prototype thermal panels embodying the principles of the subject invention have been fabricated employing molded LEXAN resin as a core material. LEXAN is believed to be a thermoplastic polycarbonate condensation product of bisphenol and phosgene and is commercially available from General Electric Corp. of Pittsfield, Mass., as the core lamina 12. LEXAN has a thermal conductivity of about 1.35Btu-in/hr-ft- F as per ASTM C-177 and manufacturer's specifications. The reflective coating, which was applied to the entire exposed surfaces of the core lamina 12 as a matter of convenience, was vacuum metallized aluminum. Such unit was tested in accord with ASTM C-177 test method and produced the following results:

| | SAMPLE J - THICKNESS 0.402 | | | | | | |
|---|---|---|---|---|---|---|---|
| | 1 | 2 | 3 | 4 | 5* | 6* | 7* |
| Hot face temperature, F. | 32.6 | 96.54 | 183.58 | 213.88 | 349.31 | 403.20 | 264.22 |
| Cold face temperature, F. | 22.91 | 54.05 | 154.40 | 186.42 | 324.43 | 385.90 | 244.93 |
| Average sample temperature, F. | 27.76 | 75.29 | 168.99 | 200.15 | 336.87 | 394.60 | 254.58 |
| Thermal conductivity "k" Btu-in/hr-ft$^2$ - F. | 0.492 | 0.513 | 0.582 | 0.607 | 0.916 | 1.45 | 1.32 |
| Total resistance, R, Hr-ft$^2$ - F/Btu | 0.82 | 0.78 | 0.69 | 0.67 | 0.44 | 0.28 | 0.31 |
| Total Conductance, C., Btu/hr-ft$^2$ - F. | 1.22 | 1.28 | 1.45 | 1.49 | 2.27 | 3.57 | 3.23 |

| | SAMPLE F - THICKNESS 0.802 | | | | |
|---|---|---|---|---|---|
| | 1 | 2 | 3 | 4 | 5 |
| Hot face temperature, F. | 25.88 | 98.00 | 215.65 | 249.81 | 275.29 |
| Cold face temperature, F. | 19.42 | 51.00 | 176.12 | 212.12 | 239.30 |
| Average sample temperature, F. | 22.65 | 74.50 | 195.89 | 230.97 | 257.30 |
| Thermal conductivity, k, Btu-in/hr-ft$^2$ - F. | 0.517 | 0.538 | 0.612 | 0.646 | 0.673 |
| Total resistance, R, Hr-ft$^2$ - F./Btu | 1.55 | 1.49 | 1.31 | 1.24 | 1.19 |
| Total conductance, C. Btu/hr-ft$^2$ - F. | 0.65 | 0.67 | 0.76 | 0.81 | 0.84 |

*Changing with time (sample above softening point)

As pointed out earlier, the subject panels have exhibited some degree of acoustic barrier properties as well as the above noted insulative characteristics.

Having thus described my invention, I claim:

1. An improved thermal panel construction, comprising a lamina of low thermal conductivity having a multiplicity of contiguous polygonal recesses on at least one of the exposed surfaces thereof, each of said polygonal recesses having a concave base surface of thermally radiant reflective character whose focal point is located above the upper marginal edges of said polygonal recesses.

2. A thermal panel construction as set forth in claim 1 further including a multi-apertured metal sheet disposed in overlying interfacial relation upon the recess defining surface of said exposed surface thereof and wherein the apertures in said metal sheet are disposed in coaxial relation with said concave base surfaces of said recesses.

3. A thermal panel construction as set forth in claim 1, wherein said lamina is of substantially rigid character.

4. A thermal panel construction as set forth in claim 1, wherein said polygonal recesses are of hexagonal configuration.

5. A thermal panel construction as set forth in claim 4 wherein subtantially all of said exposed hexagonal recess bearing surface of said lamina is of high thermally reflective character.

6. A thermal panel construction as set forth in claim 4 wherein said concave base surfaces of said recesses are coated with a thin layer of high thermally reflective character.

7. A thermal panel construction as set forth in claim 1 wherein said polygonal recesses are of at least two varying depths.

8. A thermal panel construction as set forth in claim 1 wherein said lamina is of generally planar character and presents a pair of exposed surfaces on either side thereof, each having a multiplicity of said polygonal recesses therein.

9. A thermal panel construction as set forth in claim 2 wherein said apertured metal sheet is possessed of high thermal conductivity.

10. An improved thermal panel construction comprising a substantially rigid lamina of generally planar character and of low thermal conductivity having a multiplicity of contiguous hexagonal recesses on at least one of the exposed surfaces thereof,
 each of said hexagonal recesses having an outwardly facing concave base surface whose focal point is located outwardly of the upper defining edges of said recesses and wherein said concave base surface is of high thermally reflective character.

11. A thermal panel construction as set forth in claim 10 further including a multi-apertured metal sheet disposed in overlying interfacial relation upon the recess defining surface of said exposed surface thereof and wherein the apertures in said metal sheet are disposed in coaxial relation with said concave base surfaces of said recesses.

12. A thermal panel construction as set forth in claim 11 wherein said apertured metal sheet is possessed of high thermal conductivity.

* * * * *